United States Patent
Lindstol

[15] 3,701,423
[45] Oct. 31, 1972

[54] METHOD AND APPARATUS FOR FILTERING A LIQUID

[72] Inventor: Anders Lindstol, Oakville, Ontario, Canada

[73] Assignee: Ecodyne Corporation, Chicago, Ill.

[22] Filed: May 12, 1970

[21] Appl. No.: 36,568

[52] U.S. Cl. ............... 210/80, 210/264, 210/274, 210/275
[51] Int. Cl. ................................. B01d 23/24
[58] Field of Search ......... 210/80, 82, 108, 264, 275, 210/277, 284, 274

[56] References Cited

UNITED STATES PATENTS

| | | | |
|---|---|---|---|
| 2,785,123 | 3/1957 | Stroud | 210/80 X |
| 2,879,893 | 3/1959 | Stebbins | 210/80 X |
| 3,111,486 | 11/1963 | Soriente | 210/108 |
| 3,428,177 | 2/1969 | Duff | 210/108 |

Primary Examiner—John Adee
Attorney—Hume, Clement, Hume & Lee

[57] ABSTRACT

A liquid is filtered by first delivering it to a first enclosed chamber having a first filter bed, and passing the liquid downwardly through the bed. The liquid is then delivered to a backwash storage chamber above the first bed, and then to a second enclosed chamber containing a second bed. The liquid is passed downwardly through the second bed, and is then delivered to service. The apparatus includes means defining a first filter chamber containing a first filter bed, means defining a second filter chamber containing a second filter bed, and means defining a backwash storage chamber above the filter chambers. Suitable pipe means are provided for delivering liquid in series through the first filter bed, the backwash storage chamber, and the second filter bed. Pipe means are also provided for backwashing the first and second filter beds with water from the backwash storage chamber. The preferred embodiment also provides means for gas-scouring the filter beds.

9 Claims, 6 Drawing Figures

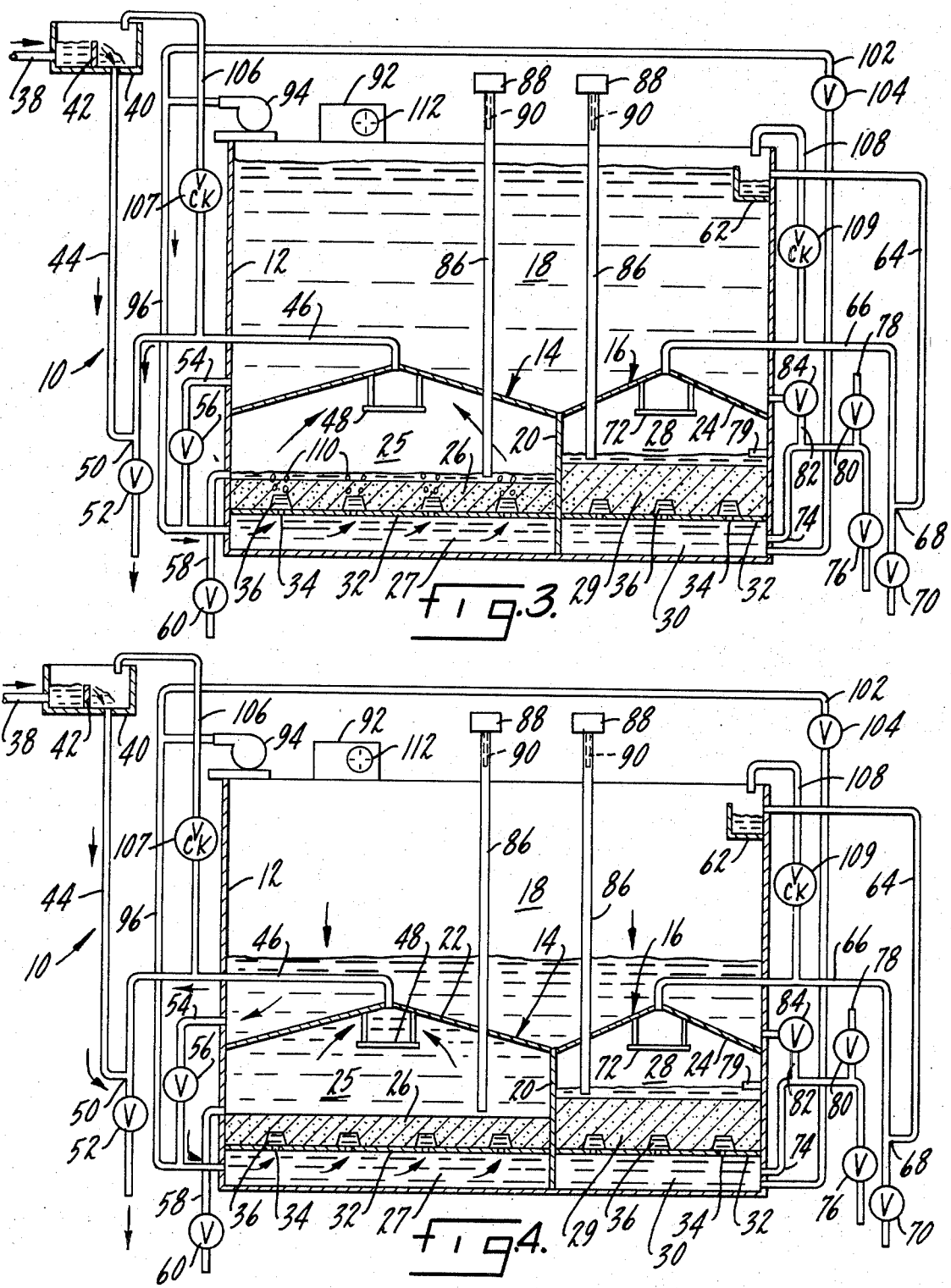

INVENTOR.
Anders Lindstol
BY Hume, Clement, Hume & Lee
Attorneys.

METHOD AND APPARATUS FOR FILTERING A LIQUID

The present invention relates to an improved method and apparatus for filtering a liquid, and more specifically to an improved method and apparatus for filtering a liquid with a pair of filter beds arranged in series.

Many filter applications present a requirement for filtering a liquid through more than one filter bed. For example, it may be desired to filter water to remove particles, and to follow this filtration with a second filtration through activated charcoal to remove taste, odor, and color. While stratified filter beds have been employed to perform such filtrations, these filter beds present a number of problems, one of which is the difficulty in cleaning the filter media. When a stratified bed is employed, the media tends to become mixed if the bed is cleaned by backwashing. Furthermore, different filter media require different backwashing rates for maximum efficiency. On the other hand, if two separate filters are employed, a great deal of additional space as well as expense are required.

Generally, the present invention provides an improved method and apparatus for filtering a liquid through a pair of filter beds arranged in series. In carrying out the method, liquid to be filtered is first delivered into a first enclosed chamber containing a first filter bed, and the liquid is passed downwardly through this first bed. Liquid that has passed through the first bed is then delivered to a backwash storage chamber above the first bed. This liquid is delivered from the backwash storage chamber to a second enclosed chamber containing a second filter bed and is passed downwardly through the second bed. Finally, the liquid is delivered to service after it has passed through the second bed.

In the filtration apparatus of the present invention, means are provided defining a first filter chamber having an upper inlet side and a lower outlet side with a first filter bed therebetween, and means are also provided defining a second filter chamber also having an upper inlet side, a lower outlet side, and having a second filter bed therebetween. Means defining a backwash storage chamber are positioned generally above the first and second filter chambers. The backwash storage chamber supplies liquid under sufficient pressure to force the liquid up through either the filter beds. First pipe means are provided for delivering liquid to be filtered to the upper inlet side of the first filter chamber. Second pipe means provide communication between the lower outlet side of this first filter chamber and the backwash storage chamber. Thus, incoming liquid passes through the first filter bed and into the backwash storage chamber through the second pipe means. Third pipe means are provided for delivering liquid from the backwash storage chamber to the upper inlet side of the second filter chamber, and fourth pipe means are provided for delivering liquid from the lower outlet side of the second filter chamber to service. Finally, fifth pipe means are provided for delivering liquid from the backwash storage chamber to the lower inlet side of the second filter chamber, in order to permit the second filter bed to be backwashed. The first filter bed may be backwashed by simply reversing the flow of water through the aforementioned second pipe means.

The invention, its construction and method of operation, together with the objects and advantages thereof, will be best understood by reference to the following detailed description, taken in conjunction with the drawings, in which:

FIG. 3 is a side elevation view similar to FIG. 1, showing the apparatus during the gas-scouring cycle for the first filter compartment;

FIG. 4 is a side elevation view similar to FIG. 1, showing the apparatus during the backwashing cycle for the first filter compartment;

Figure 1:
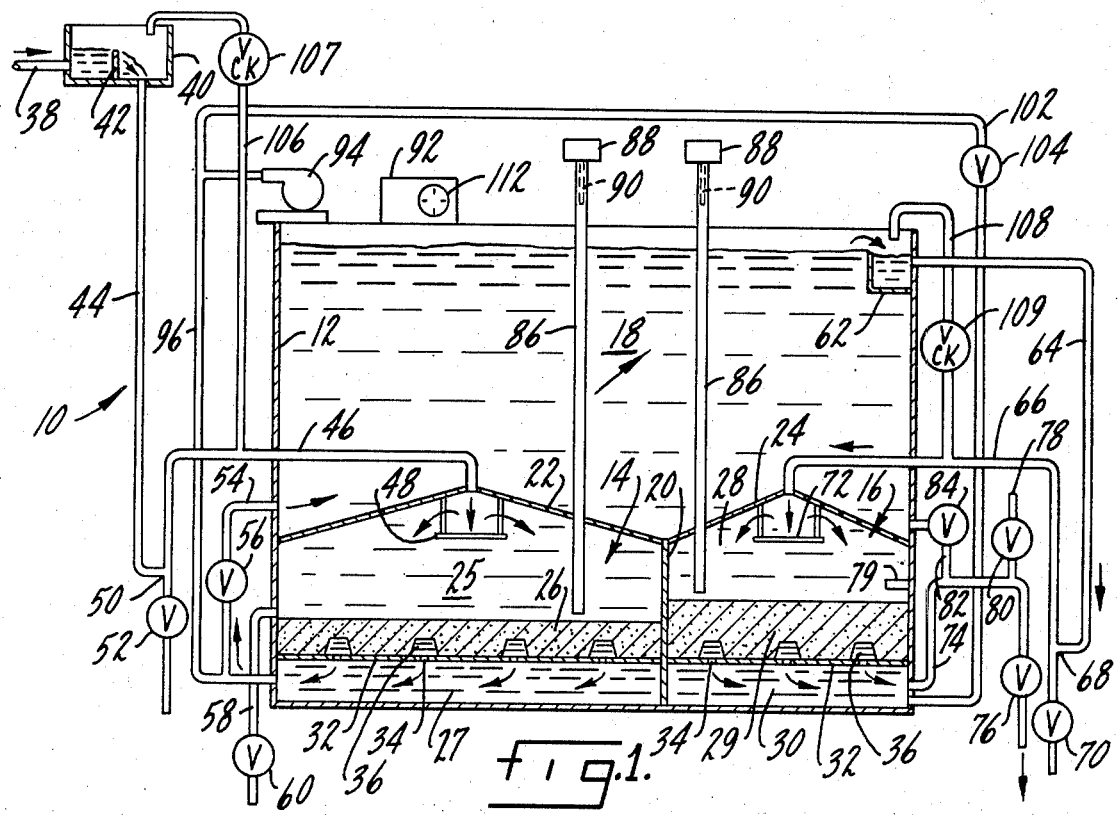
FIG. 1 is a side elevation view, partially in section, illustrating a filter apparatus embodying the features of the present invention, the apparatus being illustrated during the filtering or service cycle.
Figure 6:
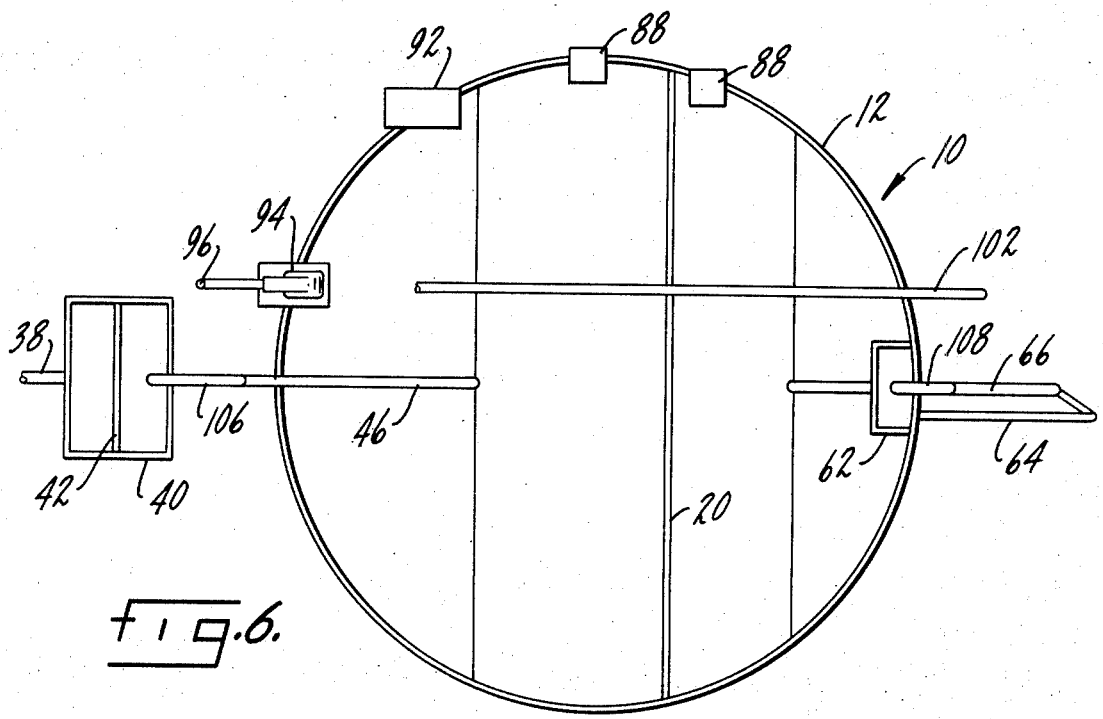
FIG. 6 is a simplified plan view of the apparatus shown in FIGS. 1–5.

Referring to FIG. 1, a filter constructed in accordance with the present invention is generally indicated by reference numeral 10. As can be seen from FIGS. 1 and 6, this filter comprises an open tank 12 of generally circular cross-sectional configuration. This tank 12 has a first filter chamber 14 and a second filter chamber 16 formed in the lower portion thereof, and a backwash storage chamber 18 in an upper portion thereof. The first and second filter chambers 14, 16, respectively, are separated from one another by a vertical partition 20.

The first filter chamber 14 is separated from the backwash storage chamber 18 by a first dome-shaped partition 22, and the second filter chamber 16 is separated from the backwash storage chamber 18 by a second dome-shaped partition 24. The first filter chamber 14 is divided into an upper inlet compartment 25, a central filter bed 26, and a lower underdrain compartment 27. Likewise, the second filter compartment 16 is divided into an upper inlet compartment 28, a central filter bed 29, and a lower underdrain compartment 30. For convenience, the inlet compartment, filter bed, and underdrain compartment associated with the first filter chamber 14 will be referred to herein as the "first" inlet compartment 25, the "first" filter bed 26, and the "first" underdrain compartment 27. The inlet compartment, filter bed, and underdrain compartment associated with the second filter compartment 16 will similarly be modified by the word "second." Each filter bed 26, 29 is separated from its respective underdrain compartment 27, 30 by a false bottom member 32 having a multiplicity of openings 34, each of which has strainer means 36 to prevent the filter media from passing into the underdrain compartments 27, 30.

Liquid to be filtered is delivered to the filter 10 through the inlet pipe 38 and through a head box 40 having a weir 42. As shown in FIG. 1, the liquid passes over the weir 42, and downwardly through a first downtake pipe 44 into a first transfer conduit 46. The first transfer conduit 46 communicates with the inlet compartment 25 of the first filter chamber 14 as shown in FIG. 1. The inlet pipe 38, head box 40, first downtake pipe 44, and first transfer conduit 46 represent a specific embodiment of the "first pipe means" referred to in the foregoing general description, the first pipe means are provided for delivering liquid to the upper inlet side of the first filter chamber 14.

A first baffle 48 is provided to distribute incoming liquid from the first transfer conduit 46 evenly over the first filter bed 26 in order to prevent channeling and to provide maximum utilization of the filter media.

As shown in the drawing, the first downtake pipe 44 communicates with the first transfer conduit 46 at a T-connection 50. The first transfer conduit 46 continues downwardly past this T-connection 50, where it communicates with a drain. The first transfer conduit 46 has a valve 52 below the T-connection 50. When the valve 52 is closed, liquid flows into the first filter chamber 14, while when the valve 52 is open, the incoming liquid will flow directly to the drain. This permits the incoming liquid to be diverted during the filter cleaning steps described herein.

A backwash delivery pipe 54 having a valve 56 provides communication between the first underdrain compartment 27 and a lower portion of the backwash storage chamber 18. This backwash delivery pipe 54 is a specific embodiment of the "second pipe means" referred to in the foregoing general description.

When the apparatus of the present invention is equipped to perform an air-scour step on the filter beds 26, 29, a drain-down pipe 58 having a valve 60 is provided, communicating with the first inlet compartment 25 just above the filter bed 26. This drain-down pipe permits most of the liquid to be drained from the first inlet compartment 25 prior to the air-scouring step, as hereinafter described.

During the service cycle, liquid that passes through the first filter chamber 14 and through the backwash delivery pipe 54 into the backwash storage chamber 18 passes over a weir 62 located in an upper portion of the backwash storage chamber 18. This weir 62 provides communication with a second downtake pipe 64 which, in turn, communicates with a second transfer conduit 66 at a T-connection 68. As with the first transfer conduit 46, the second transfer conduit 66 has a valve 70 below the T-connection 68. Thus, liquid from the backwash reservoir 18 is delivered to the second inlet compartment 28 via the second downtake pipe 64 and the second transfer conduit 66. It will thus be seen that the second downtake pipe 64 and second transfer conduit 66 comprise a specific embodiment of the "third pipe means" referred to in the foregoing general description.

A second baffle 72, similar to the first baffle 48 in the first filter chamber 14, is provided to distribute incoming liquid from the second transfer conduit 66 evenly over the second filter bed 29.

As indicated by the arrows, after the liquid has passed downwardly through the second filter bed 29, it passes to service through a service outlet pipe 74 having a valve 76. This service outlet pipe 74 is a specific embodiment of the "fourth pipe means" referred to in the foregoing general description of the invention. In the preferred embodiment, the service outlet pipe 74 has an inverted U-shape so as to form a siphon. The top of the siphon is positioned above the level of the second filter bed 29. An air vent pipe 78 having a valve 80 communicates with the top of the siphon.

A liquid level sensor 79 is positioned in the second inlet compartment 28 just above the top of the second filter bed 29. The level sensor 79 is connected to the valve 80 on the air vent pipe by suitable means (not shown) to open the vent valve 80 when the liquid level in the second inlet compartment 28 falls to this level. The valve 80 is automatically closed when the liquid level in the inlet compartment rises above the level sensor 79. It is thus seen that the siphon will be broken whenever the liquid level in the inlet compartment falls below the level of the level sensor 79, so that the second inlet compartment 28 cannot be emptied below this level.

The level sensor 79 may be any of a variety of designs that are familiar to those skilled in the art. In the most preferred embodiment, the level sensor 79 is a pressure sensor, which will sense the sharp change in pressure when the liquid level within the second inlet compartment 28 passes the level sensor 79. Such a sensor is preferably connected to the vent valve 80 by hydraulic means. Other suitable types of sensors include conductivity sensors, sonic probes, etc.

A backwashing pipe 82 having a valve 84 provides communication between a lower portion of the backwash storage chamber 18 and the service outlet pipe 74. Thus, communication is provided between the backwash storage chamber 18 and the lower outlet side of the second filter chamber 16 via the backwashing pipe 82 and the service outlet pipe 74. The backwashing pipe 82 and the service outlet pipe 74 together comprise a specific embodiment of the "fifth pipe means" referred to in the foregoing general description of the invention.

The cleaning cycle may be initiated on a time sequence, or may be initiated when a filter bed 28 has collected a predetermined amount of solids, as indicated by a rise in the pressure within an inlet compartment 25, 28. To this end, a high-level control pipe 86 communicates with each inlet compartment 25, 28. The high-level control pipes 86 are vertical pipes extending through the backwash storage chamber 18, as shown on the drawings, or positioned outside the filter chamber 10. At their upper ends, above the backwash storage chamber 18, the high-level control pipes 86 each have a high-level sensing switch 88 with a probe 90. The switch 88 is actuated when liquid, rising in the high-level control pipe 86, contacts the prove 90. The point at which the high-level sensing switch 88 is actuated represents a predetermined pressure drop across the filter bed 26, 29 with which the control pipe 86 is associated. The high-level sensing switches 88 are connected by electric wires (not shown) or the like to automatic control means 92, which automatically control the filter 10 of the present invention as hereinafter described. The probes 90 are preferably of the conductivity type.

In the most preferred embodiment of the invention, means are provided for delivering a gas under pressure to the lower outlet side of each of the filter beds 26, 29. In this instance, the means comprise an air blower 94 which communicates with the first underdrain compartment 27 via a first air pipe 96 and with the second underdrain compartment 30 via a second air pipe 102, having a valve 104. Thus, air under pressure may be delivered to the lower outlet side of either filter chamber 14,16.

In the preferred embodiment, the valves 52, 56, 60, 70, 76, 84, 104 will be automatic valves, and will be connected to the control means 92 by suitable means (not shown) such as electric wires, fluidic connections, and the like. Similarly, the air blower 94 will communicate with the control means 92 by similar means (not shown in the drawings). The manner in which such connections may be made is, of course, well known to those skilled in the art.

In operation, during the service cycle, all valves are closed except for the valve 56 on the backwash delivery pipe 54 and the valve 76 on the service outlet pipe 74. Liquid to be filtered passes through the inlet pipe 38 to the weir box 40, where it flows over the weir 42, providing a constant pressure head for the filter 10. The incoming liquid then passes through the first downtake pipe 44, into the first transfer conduit 46, and then into the first inlet compartment 25. The incoming liquid strikes the first baffle 48, and is distributed over the first filter bed 26. The liquid passes downwardly through the first filter bed 26, as shown by the arrows, and into the first underdrain compartment 27. The liquid then passes into the backwash delivery pipe 54, through which it is delivered to the backwash storage chamber 18.

As the backwash storage chamber 18 is filled, the level of liquid will rise to the weir 62, where it is collected and delivered to the second downtake pipe 64. As shown by the arrows, the liquid passes through the second downtake pipe 64 into the second transfer conduit 66, and then into the second filter chamber 16, where it strikes the second baffle 72 and is distributed over the second filter bed 29. The liquid being filtered passes downwardly through the second filter bed 29 into the second underdrain compartment 30, and then to service through the service outlet pipe 74.

Any air entrained in the incoming liquid as it passes over the weir 42 is removed from the liquid through a first air vent pipe 106, which communicates with an upper portion of the transfer conduit 46. The air vent pipe 106 has a check valve 107, which prevents any downward flow of gas through the vent pipe 106.

Similarly, a second vent pipe 108 having a check valve 109 communicates with the second transfer conduit 66. This second vent pipe 108 performs the same function in the same manner as the first vent pipe 106.

As particles are filtered from the incoming liquid, and collected by the filter beds 26, 29 the pressure within the inlet compartments 25, 28 will gradually rise until it reaches a predetermined level. This predetermined level is senses by the probes 90 in the high-level control pipes 86. When this pressure is reached, a high-level sensing switch 88 will provide a signal to the control means 92 to begin the cleaning cycle. Override means (not shown) are provided in the control means 92 so that both filter chambers 14, 16, will not go through their cleaning cycles at the same time. Because the cleaning cycles are basically the same, only the cleaning cycle for the first filter chamber 14 is shown in the drawings.

Figure 2:
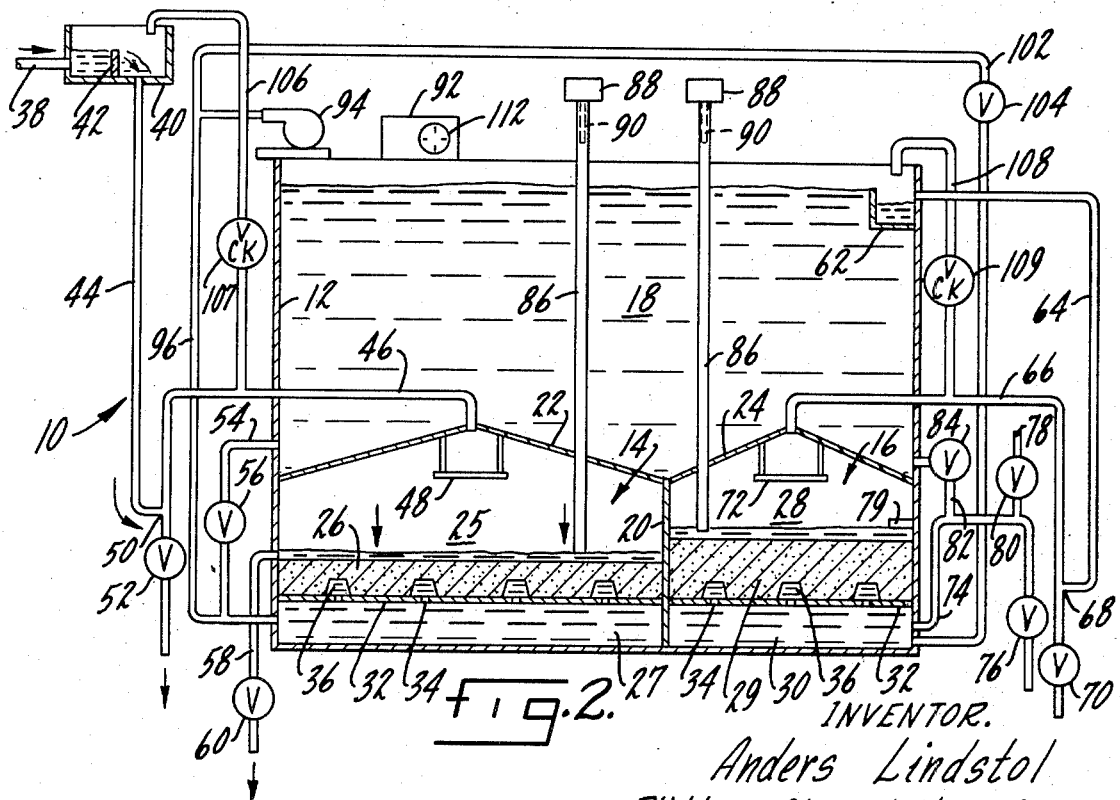
FIG. 2 is a side elevation view similar to FIG. 1, showing the filter apparatus during the drain-down cycle for the first filter compartment.

When the liquid in the high-level control pipes 86 associated with the first filter chamber 14 rises to the level of the probe 90, the high-level sensing switch 88 delivers a signal to the control means 92 to initiate the cleaning cycle for the first filter chamber 14. The cleaning cycle is begun by a drain-down step, as shown in FIG. 2. To initiate this cycle, responsive to an appropriate signal from the control means 92, the valve 56 on the backwash delivery pipe 54 is closes, and the valves 52, 60 on the first transfer conduit 46 and the drain-down pipe 58, respectively, are opened. Incoming liquid is thus delivered directly to the drain, while liquid in the first inlet compartment 25 is drained to a level just above the first filter bed 26 as shown in FIG. 2. At the same time, the liquid level in the second filter chamber 16 will fall until it reaches the level sensor 79, opening the valve 80 on the air vent pipe 78, and breaking the siphon in the service outlet pipe 74.

Next, as signaled by the control means 92, the valve 60 on the drain-down pipe 58 is closed, and the air blower 94 is started to initiate the air scouring step, as shown in FIG. 3. The air output pressure of the blower 94 when operating is adjusted so that it is greater than the liquid head in the first underdrain compartment 27 during the gas scouring cycle. The air entering the first under-drain compartment 27 passes upwardly through the first filter bed 26 at a relatively high velocity. This air, indicated by air bubbles 110, agitates the filter bed 26, and causes the foreign particles which have collected therein to become disengaged from the filter media. As the air passes through the filter bed 26, filter media will become entrained in the air. However, the filter media will disengage from the air when the air enters the air space in the upper part of the first filter chamber 14. In this air space, the filter media entrained with the scouring air will drop back into the liquid in the first filter chamber 14. The first baffle 48 also assists in disengaging filter media from the scouring air. The scouring air passes out of the first filter chamber 14 through the first vent pipe 106 and the transfer conduit 46.

After a predetermined period of time, as determined by a timer 112 in the control means 92, the air blower 94 is automatically turned off, and the backwash cycle is started. This cycle is shown in FIG. 4.

To initiate the backwash cycle, the blower 94 is shut off, and the valve 56 on the backwash delivery pipe 54 is opened. Water from the backwash storage chamber 18 will flow under the influence of gravity through the backwash delivery pipe 54 into the first underdrain compartment 27. The backwash liquid flows upwardly through the first filter bed 26, into the first inlet compartment 25, and out of the inlet compartment 25 through the first transfer conduit 46. This backwash liquid is delivered to the drain through the first transfer conduit 46. This flow of backwash liquid upwardly through the filter bed 28 removes foreign material which accumulated therein during the service cycle, and carrys it away. The end of the backwash cycle may be sensed in a number of ways, as, for example, by a level sensor (not shown) in a lower portion of the backwash storage chamber 18. A simple method is to set the timer 112 to provide sufficient time for the backwash cycle to be accomplished. If an excess of time is permitted, no harm will be done, as the backwash cycle will automatically stop as soon as the backwash storage chamber 18 is empty.

The check valve 107 on the first vent pipe 106 prevents the introduction of air into the backwash water as it passes through the first transfer conduit 46. This check valve 107 therefore prevents breaking of the siphon formed through the transfer conduit 46 during the end portion of the backwash cycle, when the water level in the backwash storage chamber 18 falls below the upper level of the first transfer conduit 46.

Figure 5:
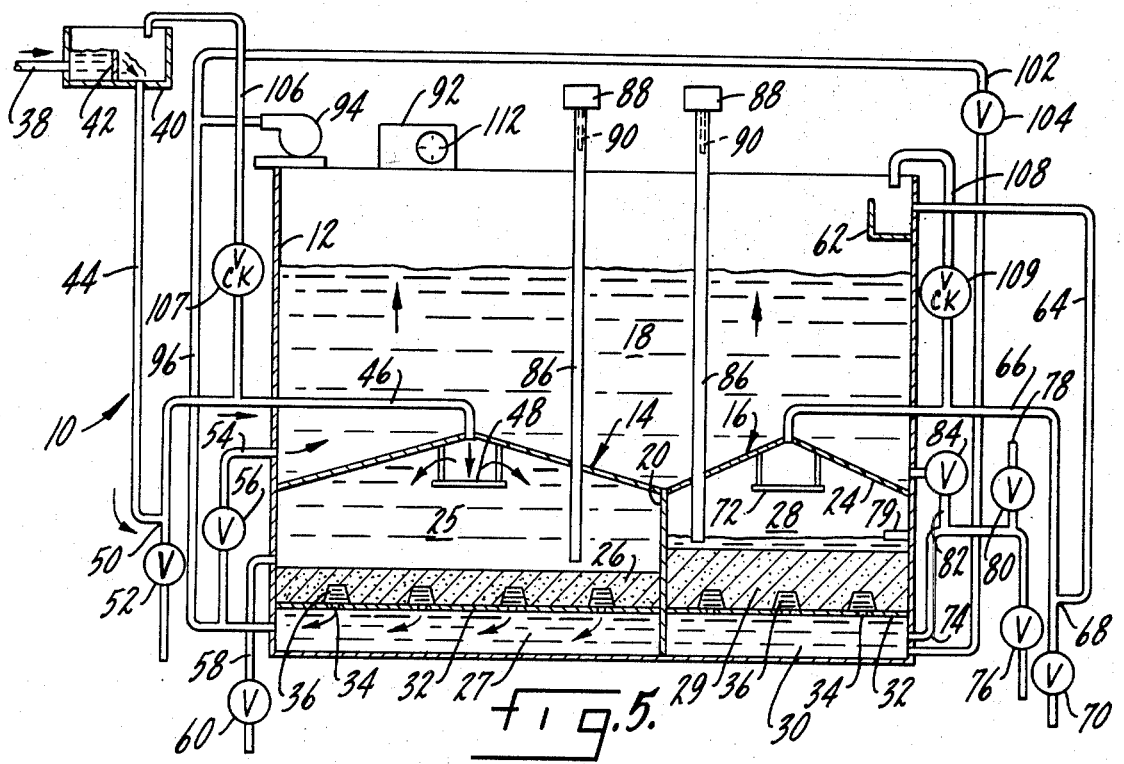
FIG. 5 is a side elevation view similar to FIG. 1, showing the apparatus during the backwash tank refill cycle.

The end of the backwash cycle is followed by a resumption of the service cycle, as shown in FIG. 5. To resume the service cycle, the valve 52 on the transfer conduit 46 is closed. Liquid again flows through the first filter compartment 14, and through the backwash delivery pipe 54 into the backwash storage chamber 18, filling the backwash storage chamber 18 as shown in FIG. 5. When the level of liquid in the backwash storage chamber 18 reaches the weir 62, delivery of the liquid to the second filter chamber 16 will be resumed, as previously described. The rise in liquid past the level sensor 79 causes the vent valve 80 to close, so that the normal service cycle is resumed.

In some applications, as those skilled in the art will appreciated, it may not be necessary to provide means for air-scouring either the first filter bed 26 or the second filter bed 29. Moreover, there may be some applications in which it is not even necessary to provide means for backwashing the second filter bed 29, as most particles are removed from the liquid by the first filter bed 26.

In the embodiment shown in the drawings, as previously described, means are provided for air-scouring and backwashing both the first filter bed 26 and the second filter bed 29. The air-scour and backwashing operations for the second filter chamber 16 are similar to those just described for the first filter chamber 14. When the high level sensing switch 88 associated with the second filter chamber 16 provides the necessary signal, the liquid that has passed through the first filter chamber 14 is delivered to the drain by opening the valve 70 on the second transfer conduit 66.

The level of liquid in the inlet compartment 26 will fall until it reaches the level sensor 79. At this point, the vent valve 80 is opened, and air is drawn into the service outlet pipe 74 through the air vent pipe 78, breaking the siphon.

The air-scour step is then begun by closing the valve 76 on the service outlet pipe 78 and opening the valve 104 on the second air pipe 102. The air blower 94 is then started to perform the air-scour step. Since the pressure head in the first filter chamber 14 is much greater than the pressure head in the second filter chamber 16, all of the air will be delivered to the lower outlet side of the second filter chamber 16.

After the air-scour step has been performed, the air blower 94 is stopped, and the valve 104 on the second air pipe 102 is closed. The valve 84, on the backwashing pipe 82 is opened, and liquid from the backwash storage chamber 18 flows through the backwashing pipe 82 and the service outlet pipe 74 into the second underdrain compartment 30, and upwardly through the second filter bed 29. The backwashing liquid is withdrawn from the second filter compartment 16 via the second transfer conduit 66, which delivers it to the drain.

Of course, as will be understood by those skilled in the art, all of the foregoing steps will be controlled automatically by the automatic control means 92. Since the majority of the filtration is performed in the first filter compartment 14, the first filter compartment 14 will ordinarily be backwashed more frequently than the second filter compartment 16. As previously stated, the control means 92 include suitable override means to prevent both filter chambers 14, 16 from being backwashed at the same time, regardless of the signals delivered by the high level sensing switches 88.

The filter apparatus of the invention may be used in many applications, for example, to filter water streams, sugar solutions, and hydrocarbon streams, as will be readily appreciated by those skilled in the art. Scouring gases other than air may be employed, such as nitrogen, oxygen, and the like, although air is preferred because of lower operating costs.

Many combinations of filter media may be employed in the filter apparatus of the present invention. It is anticipated that the first filter compartment 14 will perform the bulk of the filtration, while the second filter compartment 16 will perform a polishing function. Therefore, for example, the first filter bed 26 could comprise sand and/or anthracite filter material, while the second filter bed 29 could comprise activated carbon for color, odor and taste removal. Other possible applications would be the use of a conventional filter material for the first filter bed 26, and an ion exchange resin, such as a zeolite softener, in the second filter bed 29. Another possible application is a conventional filter material in the first filter bed 26 and a catalytic mineral bed for iron removal in the second filter bed 29. As those skilled in the art will appreciate, a multitude of other applications are available for the filter of the present invention.

While the preferred embodiment shown in the drawings has only two beds arranged in series with a common backwash chamber, those skilled in the art will appreciate that additional pairs of beds may be employed, also sharing the same backwash chamber. All that would be necessary is that a proper coordination of the backwashing cycles be provided, so that no two beds are backwashed at the same time.

As will be obvious from the foregoing description of the invention, a particular advantage of the filter is that it is gravity-fed, no pumps being required. However, if it is desired to save head room, a pump may be substituted for the elevated head box 40 shown in the drawings. Additional pumps may also be provided at appropriate positions in the apparatus as desired.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for filtering a liquid comprising: delivering liquid to be filtered into a first enclosed chamber containing a first filter bed; passing said liquid downwardly through said first filter bed; delivering liquid that has passed through said first filter bed to a backwash storage chamber above said first filter bed; delivering said liquid from said backwash storage chamber to a second enclosed chamber containing a second filter bed; passing said liquid downwardly through said second filter bed; delivering said liquid to service after it has passed through said second filter bed; and periodically independently backwashing said first and second filter beds by passing said liquid from said backwash storage chamber upwardly through said filter beds.

2. The method as defined in claim 1 further including the step of scouring said first bed by passing a stream of gas under pressure upwardly through said first filter bed prior to said backwashing.

3. The method as defined in claim 2 further including the step of scouring said second filter bed by passing a stream of gas under pressure upwardly through said second filter bed prior to said backwashing.

4. Improved filtration apparatus comprising: means defining a first filter chamber having an upper inlet side and a lower outlet side with a first filter bed therebetween; means defining a second filter chamber having an upper inlet side and a lower outlet side with a second filter bed therebetween; means defining a backwash storage chamber above said first and second filter chambers, said backwash storage chamber supplying backwash liquid under sufficient pressure to force said liquid upwardly through either of said filter beds; first pipe means for delivering liquid to said upper inlet side of said first filter chamber; second pipe means providing communication between said lower outlet side of said first filter chamber and said backwash storage chamber; third pipe means for delivering liquid from said backwash chamber to said upper inlet side of said second filter chamber; fourth pipe means for delivering liquid from said lower outlet side of said second filter chamber to service; and fifth pipe means for delivering liquid from said backwash storage chamber to said lower outlet side of said second filter chamber.

5. The filtration apparatus as defined in claim 4 wherein said fourth pipe means is an inverted U-shaped siphon, the top of said siphon being positioned above the level of said second filter bed, said siphon having air vent means communicating therewith.

6. The filtration apparatus as defined in claim 4 wherein said second filter bed comprises activated carbon.

7. The filtration apparatus as defined in claim 4 wherein said second filter bed comprises an ion exchange resin.

8. The filtration apparatus as defined in claim 4 further including means for delivering a gas under pressure to said lower outlet side of said first filter bed.

9. The filtration apparatus as defined in claim 8 further including means for delivering a gas under pressure to said lower outlet side of said second filter bed.

* * * * *